3,270,495
Patented Sept. 6, 1966

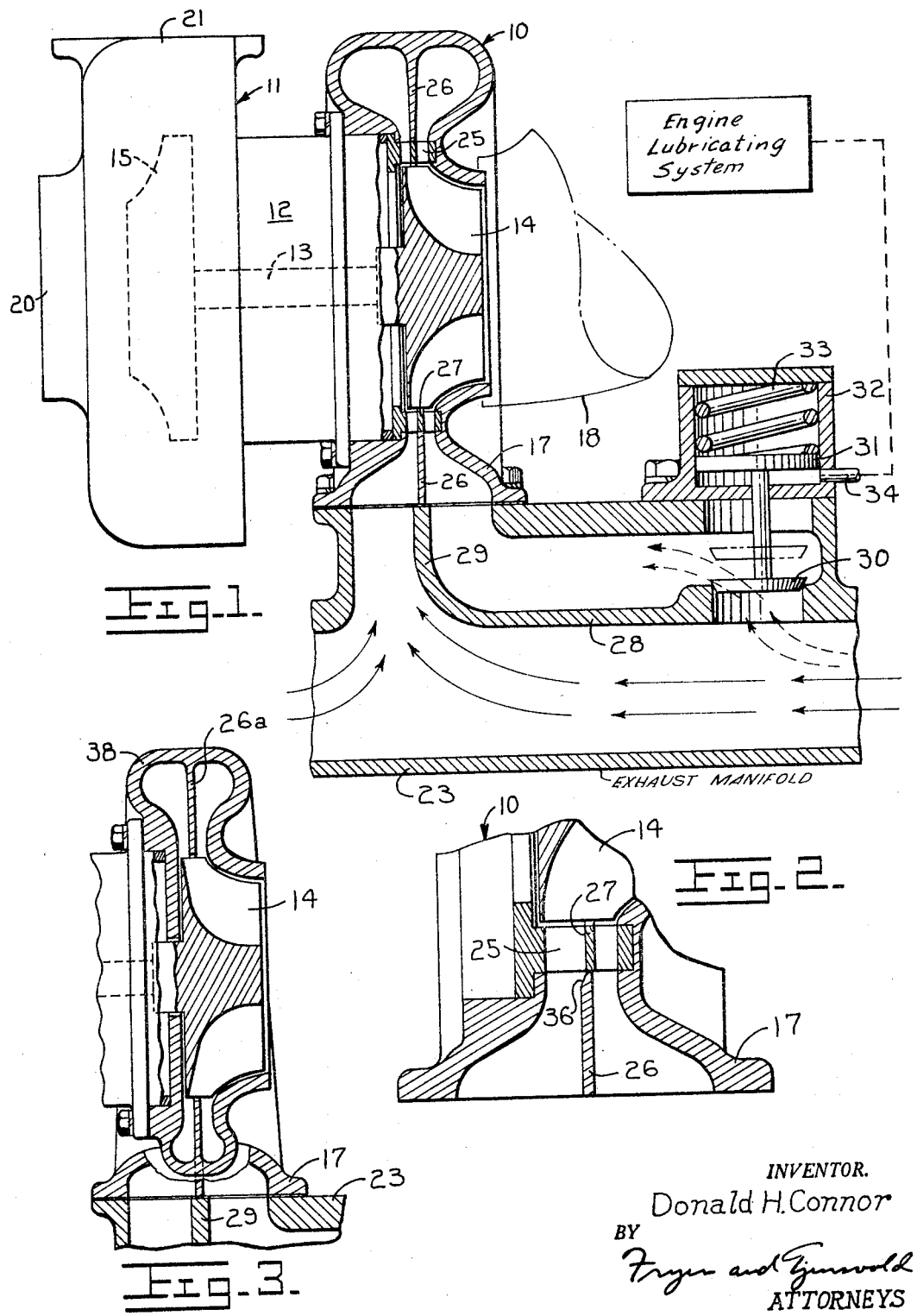

3,270,495
APPARATUS FOR CONTROLLING SPEED AND VIBRATION OF ENGINE TURBOCHARGERS
Donald H. Connor, Chillicothe, Ill., assignor to Caterpillar Tractor Co., Peoria, Ill., a corporation of California
Continuation of application Ser. No. 63,067, Oct. 17, 1960. This application Aug. 14, 1963, Ser. No. 302,074
5 Claims. (Cl. 60—13)

This invention relates to the control of the speed of turbine driven superchargers or turbochargers used for augmenting the supply of air to internal combustion engines.

This application is a continuation of my copending application Serial No. 63,067, now abandoned.

It is a common practice to use a turbine wheel driven by the exhaust gases of an engine to drive a compressor wheel which in turn supplies air or supercharges the flow of air to the combustion space in the engine cylinders. These turbo-chargers obtain very high speeds and are designed to operate in the range of engine operation such as the low-speed high-load condition at which point it is desirable to increase the mass of air to develop a high horsepower output. When the engine is operated at high speed the volume of exhaust is greater tending to drive the turbocharger at even higher speed when the greater horsepower output is not necessary. Under many combinations of engine speed and load the turbocharger speeds attained exceed the limit for which the turbochargers are designed resulting in damage from excessive centrifugal forces developed. Many devices presently used for controlling turbocharger speed contain several moving parts and are subject to malfunction due to corrosion of some of the parts and breakage of others.

It is an object of the present invention to provide a simple, inexpensive and positively acting device to insure against excessive speeds in an engine driven turbocharger and a further object of the invention is to provide means for distributing flow of exhaust gases to a turbocharger in a manner to reduce the velocity of the gases when the speed of operation of the engine exceeds a predetermined value to insure against excessive speeding of the turbocharger.

Another object of this invention is to provide a turbocharger having a rotor with a surrounding annular housing for directing gases from the exhaust manifold of an internal combustion engine to the periphery of the rotor and having an annular partition in said housing co-acting with a wall which divides the exhaust manifold into separate compartments and providing a relatively vibration-free operation of the turbocharger.

Further and more specific objects and advantages of the invention and the manner in which it is carried into practice are made apparent in the following specification wherein reference is made to the accompanying drawing.

In the drawing:

FIG. 1 is a view partially in section of a common type of turbocharger showing a portion of an engine exhaust manifold in communication therewith and illustrating one form which the apparatus of the present invention may assume;

FIG. 2 is a fragmentary sectional view of a portion of the turbocharger shown in FIG. 1 illustrating a modification thereof; and FIG. 3 is a sectional view through a different type of turbocharger illustrating the manner in which the present invention is applied thereto.

The turbocharger shown in FIG. 1 of the drawing comprises a turbine unit generally indicated at 10 and a compressor unit generally indicated at 11 connected as by an integral bearing housing 12 in which a shaft 13 is rotatably supported. The shaft 13 serves as a common support for a turbine wheel or rotor 14 and a compressor wheel shown in dotted lines at 15.

This turbocharger functions in a conventional manner, the turbine wheel 14 being rotated on the longitudinal axis of shaft 13 by the exhaust gas of an internal combustion engine entering through an annular inlet housing 17 and passing over stator blades 25 to impinge the blades of the turbine wheel and impart high speed rotation thereto. The exhaust gases then flow outwardly through an exhaust fitting indicated in broken lines at 18. The rotation of the turbine wheel 14 is imparted through the shaft 13 to the compressor wheel 15, the function of which is to draw atmospheric air through an inlet 20 and dispel it radially outwardly through a discharge opening at the point 21 from which it is directed by a conduit, not shown, to the intake manifold of an internal combustion engine.

If the turbocharger is economically designed, it produces the maximum air requirement of the engine with which it is used at a speed below maximum engine speed or at the critical range of engine operation which occurs at a low-speed high-load condition. At higher engine speeds, the volume and the velocity of engine exhaust is greater with the result that the rotating parts of the turbocharger may be over-stressed to the point of breakage.

To prevent excessively high speeds of the turbocharger, the present invention provides means for controlling the flow of exhaust gas from the engine. At low engine speeds it passes through a small orifice at high velocity to impart high speed rotation to the turbocharger. At high engine speeds the gas passes through a larger orifice or two orifices so that its velocity is reduced and consequently its capacity to drive the turbocharger at high speeds is proportionately reduced. This is accomplished by the mechanism or control means best shown in FIG. 1 wherein a portion of the exhaust manifold of an internal combustion engine is shown at 23. The intake or inlet housing of the turbine portion of the turbocharger 10 which is shown at 17 is connected to a terminal and central portion of this exhaust manifold 23 so that some, preferably half, of the cylinders of the engine will exhaust into the manifold on one side of the intake 17 while the others, or other half, will exhaust into the same manifold on the opposite side of the intake 17. As clearly shown, the intake or inlet 17 is arranged in substantial perpendicular and surrounding relationship with respect to the axis of shaft 13.

The annular intake or inlet housing which surrounds the nozzle ring containing the stator blades of the turbine shown at 25 is divided by an annular partition 26 and the stator blades are preferably also separated to form pairs of blades by partitions shown at 27. As clearly shown partition 26 is arranged to extend in a substantial radial direction from and in surrounding relationship with respect to the axis of shaft 13 to divide the inlet into first and second annular compartments. A wall 28 is provided interiorly of the exhaust manifold 23 to form a chamber or two manifold passages and has a portion 29 coinciding with the divider 26 in the turbine. Thus, a first of the above described inlet compartments is arranged in constant communication with the manifold. This wall provides a chamber normally separated from the interior of the exhaust manifold by a valve 30, the stem of which carries a piston 31 reciprocably mounted in a cylinder 32. A spring 33 normally urges the valve 30 to its closed position and fluid under pressure may be introduced to the cylinder 32 beneath the piston 31 through a line 34 to oppose the action of the spring 33 and effect opening of the valve to the position indicated in broken lines.

Under normal operation of the engine under low-speed high-load conditions where supercharging is desired, all of the exhaust from both ends of the exhaust manifold 23 is directed as indicated by the arrows in solid lines through one-half of the intake fitting 17 and, therefore, at a relatively high velocity to rotate the turbine at high speed and produce the desired supercharging of the engine. At higher engine speeds, a fluid, the pressure of which depends upon the speed of engine operation is introduced to the cylinder 32 through the line 34 to raise the valve 30 to its open position. This permits a large portion of the exhaust gas to flow in the direction of the arrows shown in dotted lines so that the exhaust gas is introduced through substantially the entire opening provided by the intake 17 and its velocity is decreased to produce relatively slow operation of the turbine and thus prevent dangerously excessive speeds thereof.

The fluid employed to actuate the valve 30 may be the lubricating oil of the engine, the pressure of which is determined by engine speeds, and the force of the spring 33 may be selected to effect opening of the valve at any critical or predetermined engine speed. The precise amount of exhaust gas flowing during critical engine operations may be varied by providing a bevel as indicated at 36 on the edge of the partition 26 and by varying the configuration of this bevel the velocity of the gas and the area of the stator blades 25 impinged thereby may be controlled.

There are other types of turbochargers, one example of which is illustrated in FIG. 3 of the drawings, which do not employ a nozzle ring or stator blades but are provided with a volute housing shown at 38 in FIG. 3 from which the propelling gas flows directly against the blades of the turbine rotor 14. The method and principles of the present invention are adapted to this type of housing by simply providing a dividing wall 26a therein, the function of which will be readily apparent from the foregoing description.

Other advantages result from the construction herein disclosed, one being that gases from the two compartments in the exhaust manifold of the engine are always imposed upon the rotor from an annular chamber surrounding the rotor so that loads are imposed upon it circumferentially rather than segmentally in some types of turbochargers, thus balancing the loads imposed upon the rotor shaft bearings. Furthermore it is found that the use of the radially arranged partition 26 in the rotor housing associated with a wall which divides the exhaust manifold into more than one compartment results in reduction to a marked degree of vibration which is inherent in turbochargers powered by the exhaust gas of an internal combustion engine.

I claim:

1. An engine turbocharger system comprising a turbocharger having a rotor arranged for rotation on a longitudinal axis in an annular housing, an engine manifold operatively connected to said turbocharger and terminating at said housing, said housing comprising an annular inlet for said manifold gases arranged in substantial perpendicular and surrounding relationship with respect to said axis for discharging gases onto said rotor and control means for preventing overspeeding of said rotor, said control means comprising an annular partition in said housing arranged to extend in a substantial radial direction from and in surrounding relationship with respect to said axis to divide said inlet into first and second annular compartments, said first compartment arranged in constant communicating relationship with said manifold, a wall member arranged in said manifold to form a chamber therein in communicating relationship with said second compartment, means forming an opening in said wall member at a location spaced from the connection of said first compartment and the inlet toward some of the cylinder outlets in connection with said manifold, and valve means for opening or closing said opening for either permitting gases in said manifold to flow through said first compartment or through said first and second compartments.

2. An engine turbocharger system comprising a turbocharger having a rotor arranged for rotation on a longitudinal axis in an annular housing, an engine manifold operatively connected to said turbocharger and terminating at said housing, said housing comprising an annular inlet for said manifold gases arranged in substantial perpendicular and surrounding relationship with respect to said axis for discharging gases onto said rotor and control means for preventing overspeeding of said rotor, said control means comprising an annular partition in said housing arranged to extend in a substantial radial direction from and in surrounding relationship with respect to said axis to divide said inlet into first and second annular compartments, said first compartment arranged in constant communicating relationship with said manifold, a wall member arranged in said manifold to form a chamber therein in communicating relationship with said second compartment, means forming an opening in said wall member, at a location spaced from the connection of said first compartment and inlet toward some of the cylinder outlets in connection with said manifold for permitting gases in said manifold to flow through said first and second compartments.

3. In an internal combustion engine turbocharger system, a turbocharger having a rotor, an annular housing surrounding the rotor, an engine manifold communicating with the annular housing at a first location on the outer periphery of said housing for directing gas generally radially inwardly to the rotor to impart rotation thereto, an annular partition in the housing in substantially the same plane as the plane of the rotor and being disposed and extending radially outwardly of the rotor and dividing the housing into two compartments each surrounding the rotor and disposed axially one compartment to the other, and said manifold having separate passages each passage being in operative connection with one compartment.

4. In an engine turbocharger system which includes a turbocharger having a rotor, an annular housing surrounding the rotor and an engine manifold communicating with the annular housing for directing gas to the rotor to impart rotation thereto, the improvement which comprises an annular partition in the housing extending radially thereof and dividing it into two compartments each surrounding the rotor, said manifold having separate passages for gas communicating separately, at least one with each housing compartment, the passages in the manifold being formed in part by a wall which registers with the partition in the rotor housing, and wherein the manifold communicates with the housing through an opening at one area in its periphery and gas entering said opening is free to pass throughout the entire area of both housing compartments and to impinge the rotor in a direction generally radially inwardly thereof to avoid side loading of the rotor.

5. In a turbocharger having a rotor and a control system for varying the velocity of the rotor wherein the control system includes a manifold terminating in an inlet separated into two passages and means by which gases in the manifold can be directed through the inlet via one passage or via both passages, the combination comprising an annular housing surrounding the rotor and having an outer portion extending radially outwardly therefrom, an annular partition in said housing in the plane of said rotor radially dividing said outer portion of said housing into two separate compartments each surrounding the rotor, each of said compartments arranged in communication with one of the manifold inlet passages through openings in the circumferential surface of said housing, said passages being in side by side relationship at the inlet with both being directed inwardly toward the housing.

(References on following page)

References Cited by the Examiner

UNITED STATES PATENTS

| | | | |
|---|---|---|---|
| 1,816,737 | 7/1931 | Moss | 60—13 |
| 1,889,816 | 12/1932 | White. | |
| 2,321,943 | 6/1943 | Sampietro | 60—13 X |
| 2,730,861 | 1/1956 | Buchi | 60—13 |
| 2,838,907 | 6/1958 | Cowland | 60—13 |

FOREIGN PATENTS 670,067  11/1929  France.

MARK NEWMAN, *Primary Examiner.*

JULIUS E. WEST, RICHARD B. WILKINSON,
*Examiners.*

N. E. ABRAMS, L. M. GOODRIDGE,
*Assistant Examiners.*